United States Patent [19]

Schott, Jr.

[11] 4,236,884
[45] Dec. 2, 1980

[54] INTERNAL AIR COOLING OF TUBULAR PLASTIC FILM

[75] Inventor: Charles M. Schott, Jr., Gloucester, Mass.

[73] Assignee: Gloucester Engineering Co., Inc., Gloucester, Mass.

[21] Appl. No.: 610,631

[22] Filed: Sep. 5, 1975

[51] Int. Cl.³ .................................................. B29D 23/04
[52] U.S. Cl. .................................... 425/72 R; 425/326.1
[58] Field of Search ...................... 425/72, 377, 326 R, 425/455 R, 326.1, 387.1; 264/88, 90, 95

[56] References Cited

U.S. PATENT DOCUMENTS

| | | | |
|---|---|---|---|
| 2,612,656 | 10/1952 | Lyon | 425/377 X |
| 3,280,429 | 10/1966 | Haley | 425/72 X |
| 3,583,034 | 6/1971 | Colombo | 425/72 X |
| 3,649,143 | 3/1972 | Papesh et al. | 425/72 X |
| 3,762,853 | 10/1973 | Upmeier | 425/326 R |
| 3,898,028 | 8/1975 | Upmeier | 425/326 R |
| 3,902,832 | 9/1975 | Gregory et al. | 425/72 |
| 3,947,170 | 3/1976 | Zimmerman | 425/72 R |

Primary Examiner—Mark Rosenbaum

[57] ABSTRACT

A rotary die assembly for extruding plastic tube, having a plurality of discrete cooling air inlet conduits extending through the male member of the die and connected at their inlet ends to circumferentially spaced apart positions to a wall of an annular inlet plenum so as to receive inlet air through the wall; the plenum is located outside of and generally coaxially with the rotating die members, the remaining walls of the plenum being stationary and connected to receive a supply of cooling air; exhaust air from the interior of the extruding tube similarly passes through a number of discrete conduits to a discharge plenum; the conduits are insulated to limit heat transfer between the heated die elements and the flowing air; a transition assembly enables the inner air to be efficiently distributed and the outlet air to be efficiently divided into the flows mentioned.

6 Claims, 8 Drawing Figures

INTERNAL AIR COOLING OF TUBULAR PLASTIC FILM

This invention relates to apparatus for forming plastic film or sheet, in which molten plastic under pressure passes from an extruder through an annular die orifice, issuing in the form of a tube, whereupon it is cooled both on its interior and exterior, usually expanded by captured air, is flattened, optionally slit and taken up on a roll.

The speed at which film or sheet can be produced is largely determined by the effective rate of cooling. Prior die assemblies have used means for external air cooling of the extruded tube, and some have employed internal air cooling as well. While a combination of both is preferred in numerous instances from a speed of process point of view, mechanical complexities have arisen in the case where the die members are rotatably oscillated due to cumbersome and flow-varying air hoses connected to the oscillating assembly; other desired configurations such as dies rotating continuously in one direction have not employed such internal air cooling; and, in general, apparatus employing internal air cooling have been disadvantageously limited in internal air cooling capacity.

Objects of the invention are to provide an improved rotary die apparatus employing internal cooling in a manner which allows for rapid cooling of the extrudate without detrimental cooling of the die and which, for the size of the tubing produced, occupies relatively little space, is capable of producing improved rolls of film with an increased production speed and is easily maintainable, thereby minimizing capital cost.

In general the invention features a die assembly for receiving molten plastic and extruding a tube of such plastic, including male and female die members forming an annular extrusion orifice, a supply passage for molten plastic to the extrusion orifice and discrete air conduits extending from a cylindrical transition member within the male member and interconnected with stationary portions of inlet and outlet plenums constructed so as to be supported and carried by the rotating die.

Advantageously, these discrete air conduits are constructed so as to allow for an insulating air gap between them and the male die member.

Other advantages and features of the invention will be apparent from the description and drawings herein of a preferred embodiment thereof, in which.

Figure 1:
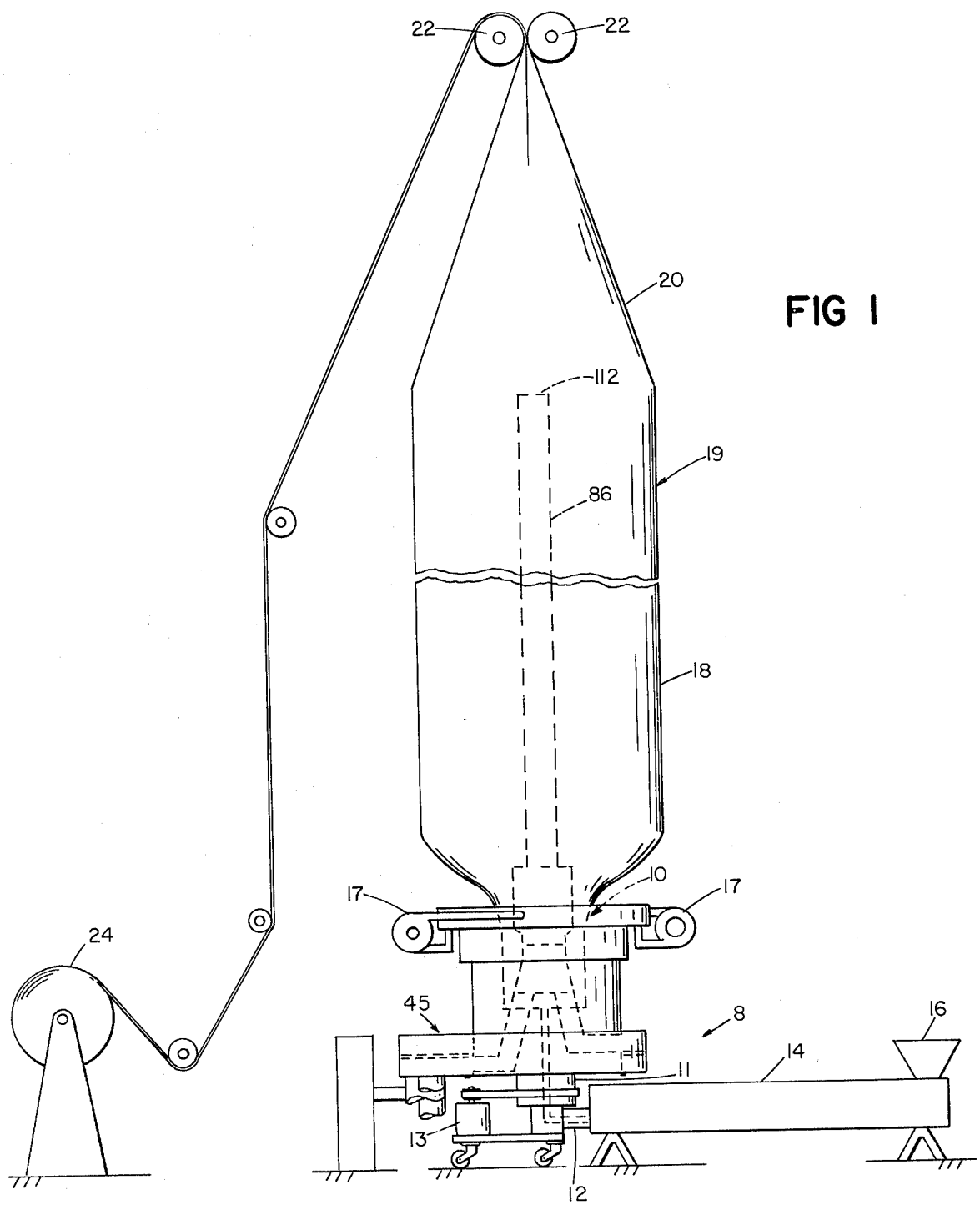
FIG. 1 is an overall view of an extrusion line employing a preferred embodiment of the die apparatus of the invention.
Figure 2:
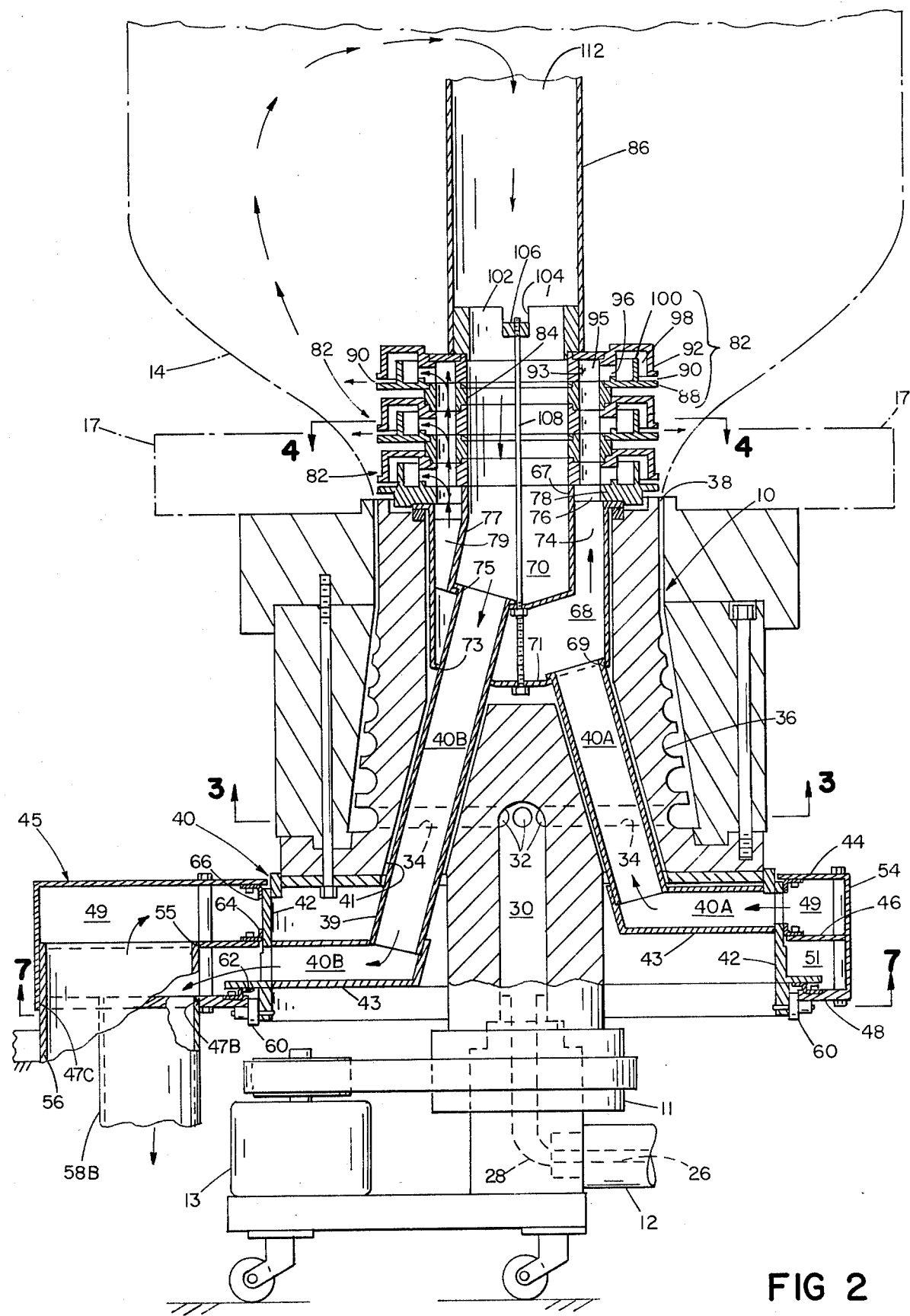
FIG. 2 is a vertical cross-sectional view on an enlarged scale of the die apparatus of FIG. 1.

Referring to FIG. 1, the die apparatus 8 includes a die ring 10 (which defines the annular plastic emitting orifice 38 as shown in FIG. 2) and is mounted over rotator section 11 driven by motor 13. Plastic raw material is introduced into extruder 14 through hopper 16. Conduit 12 receives a supply of molten plastic under pressure from extruder 14 and extends through rotator section 11 to the central portion of die apparatus 8 (as described in detail below). The plastic tube 18 is emitted from die ring 10, is cooled on its exterior by air blowers 17 and on its interior (as described in detail below), is expanded, e.g., by captured air, proceeds up tower 19, then is collapsed along path 20, to nip rollers 22 from which the extrudate is led to take up roll 24.

Figure 3:
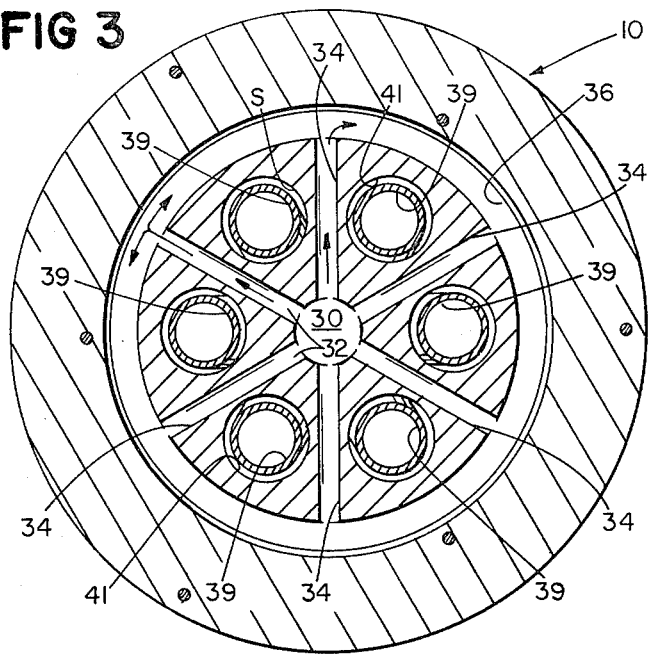
FIG. 3 is a horizontal cross-sectional view, taken on line 3—3, of the male member of the die apparatus of FIG. 1.

Referring to FIGS. 1, 2 and 3, conduit 12 includes a connector section 26, a diverter section 28, a central supply passage 30, and six openings 32 radially distributed about the circumference of the inner end of supply passage 30, each communicating with a respective radial passage 34 which in turn communicates via helical groove 36 with plastic emitting orifice 38, the grooves having sufficient cross-communication to enable a circumferentially uniform flow of plastic through orifice 38. Depending on the size of the particular die in use, the number of such radial passages may be increased or decreased as is found desirable.

Figure 8:
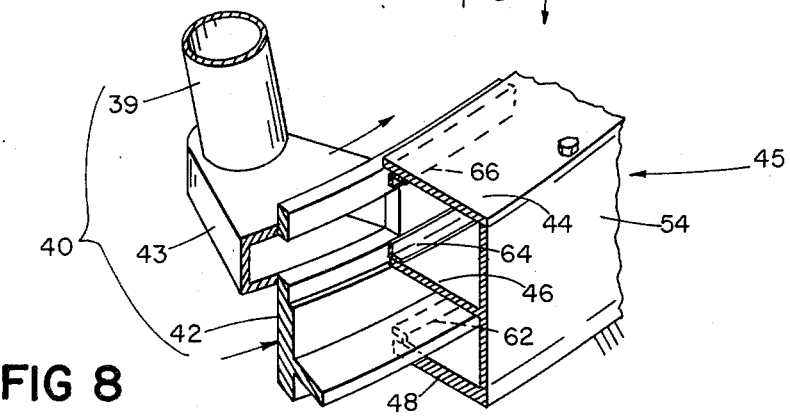
FIG. 8 is a horizontal cross-sectional view of a portion of the plenum assembly and associated air conduits of FIG. 2.

Referring to FIGS. 2, 3 and 8, an air conduit 40, comprised of tube 39 and transfer joint 43, is inserted within a hollow space 41 located between each radial passage 34 and is spaced apart from the walls of these radial passages. The space S existing between tube 39 and the walls of radial passages 34 acts as an effective air gap insulating the air which passes through the conduits, as described in greater detail below, from the heat of the molten plastic flowing through the radial passages.

Since uneven air distribution is a considerable cause of variation in the thickness of the film, rotation of the die distributes variations about the tube and spreads them evenly across the final roll. An important feature of this invention is the particular construction of the air plenum assembly 45 which allows the weight of stationary portions of the plenum to be carried by the rotating die apparatus, while directing cooling air into and exhausting warmed air from respective inlet and exhaust conduits during rotation of the die apparatus.

Figure 7:
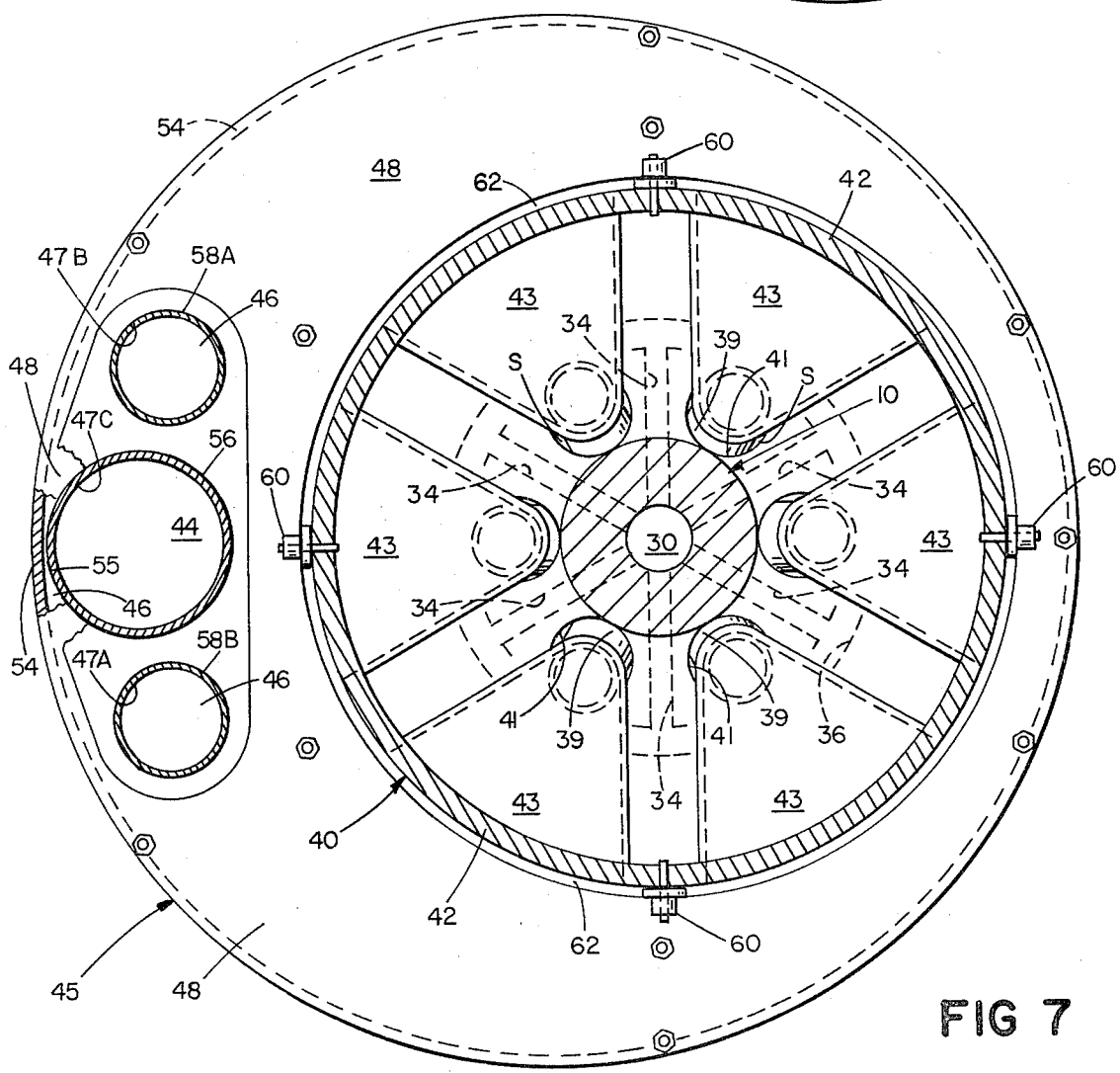
FIG. 7 is a horizontal cross-sectional view taken on line 7—7 of the plenum assembly of FIG. 2.

Referring to FIGS. 2, 7 and 8, plenum assembly 45 is defined by three eccentrically shaped continuous washers, 44, 46 and 48, spaced apart vertically and supported by outer wall 54. As shown in FIG. 7, lower washer 48 has three openings 47A, 47B and 47C. Openings 47A and 47B provide a connection for outlet pipes 58A (not shown) and 58B respectively. Feed pipe 56 passes through opening 47C and connects to opening 55 located in washer 46. Ring 42 acts as an interrupted inner wall of plenum assembly 45 and is connected to transfer joints 43 and carried by the rotating die apparatus.

A series of rollers 60, attached to the die apparatus, provide support to the plenum assembly while maintaining alignment between the stationary plenum assembly portions and ring 42 and permit relative motion between ring 42 and the remainder of the plenum assembly. Rubbing seals 62, 64, and 66 prevent the escape of air.

Constructed in this manner, the upper portion 49 of the plenum assembly defines a feed plenum, taking cooling air from feed pipe 56 and allowing for a uniform flow of air into eachh respective inlet conduit 40A despite its individual rotated position relative to the feed pipe. Likewise, the lower portion 51 of the plenum assembly defines an outlet plenum, accepting warmed air from each respective outlet conduit 40B and directing this air into outlet pipes 58A and 58B.

Figure 5:
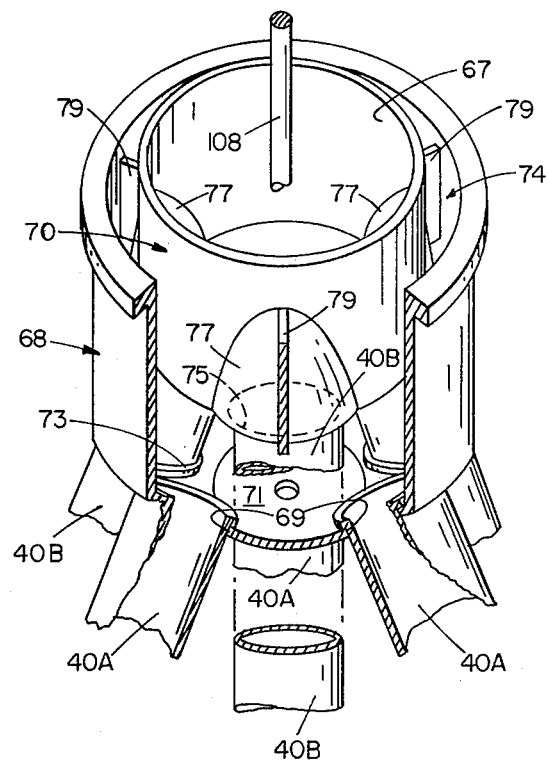
FIG. 5 is a vertical cross-sectional view on a larger scale of the two cylindrical members and associated air conduits of FIG. 2.
Figure 6:
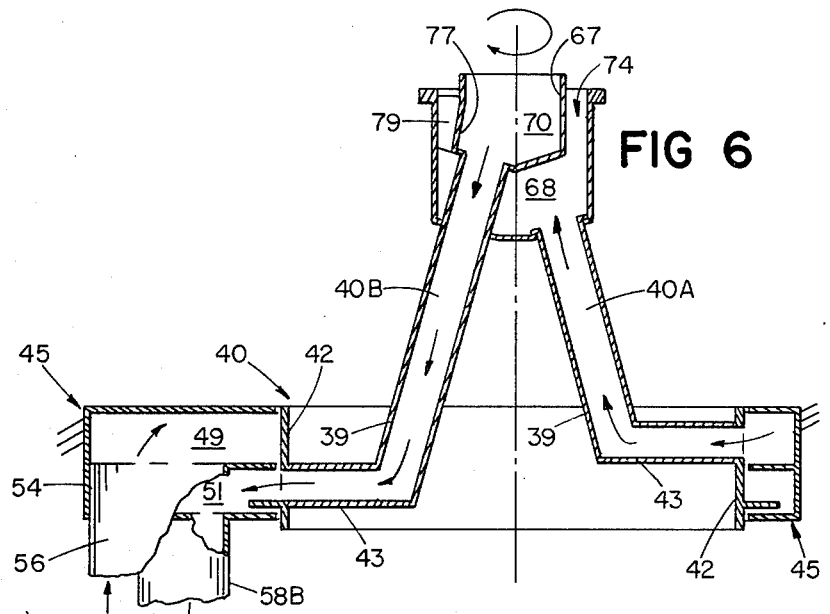
FIG. 6 is a vertical cross-sectional view, similar to FIG. 5 of the two cylindrical members indicating the upward flow of cooling air and the downward flow of warm air.

Referring now to FIGS. 2, 5, and 6, each inlet conduit 40A at its inner end connects to an opening 69 in the bottom portion 71 of a generally cylindrical, hollow member 68. Each outlet conduit 40B extends through a similar opening 73 in the bottom portion 71 of cylindrical member 68 and connects to an opening 75 in the bottom and side portion 77 of a similar, generally cylindrical, hollow member 70 of lesser diameter than cylindrical member 68 and located partially within member 68. The walls of cylindrical members 68 and 70 are connected by circumferentially spaced apart vertical fins 79.

Cooling air enters cylindrical member 68 through conduits 40A and passes upwardly into the cross-section space 74 between the walls of cylindrical members 68 and 70. This flow continues in an upward direction from cross-section space 74 through discharge annulist 76 (as shown in FIG. 2) located in plate 78 and into a series of air rings 82 stacked on one another. Each such air ring comprises a bottom plate 88, a discharge slot 90, a top plate 92, an interior wall 93, an inner air chamber 95, an air port 96, an outer air chamber 98 and a diffuser 100. Each air ring is connected by a spacer ring 84. A clamping ring 102, containing two notched formations 104 and 104' (not shown) cut in its upper rim, is mounted atop the top plate of the uppermost air ring. Cross bar 106 spans the diameter of the clamping ring with its respective ends seated within notch formations 104 and 104'. A clamping bolt 108 extends from cross bar 106 through the center of each air ring to the bottom portion 71 of cylindrical member 68 and acts as a support for the entire air ring assembly. Further crossbar supports 110 may be added to connect opposing points of the interior wall 93 of each air ring. Exhaust tube 86 is mounted atop the top plate of the uppermost air ring, surrounds clamping ring 102 and extends upwardly into the extruded tube.

Figure 4:
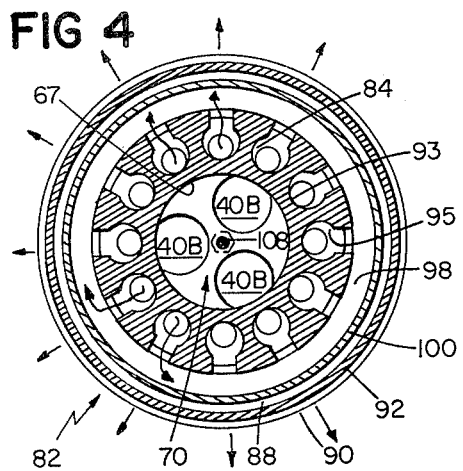
FIG. 4 is a horizontal cross-section view, taken on line 4—4 of the air ring assembly and central exhaust tube of FIG. 2.

Upwardly flowing cooling air enters inner air chamber 95 of the lowermost air ring 82 through discharge annulist 76. Some of this air moves from inner chamber 95 through air port 96 and into outer chamber 98 where it then passes over diffuser 100 and through discharge slot 90 where it is directed against the inner surface of the extruded tube as shown by arrows in FIG. 2. The remaining air continues upwardly from inner chamber 95 through connecting spacer ring 84 into the next air ring where, again, some air escapes through that ring's discharge slot. This process continues throughout each air ring until all air has been directed through discharge slots at the inner surface of the extruded tube. FIG. 4 is a horizontal cross-sectional view taken a line 4—4 and depicts the flow of air from air rings 82 into the extruded tube in the manner just described.

Once expended, this air is then drawn into the top portion 112 of exhaust tube 86. From this central tube, the expended warmed air passes downwardly and is directed, as shown in FIGS. 2 and 6, into internal portion 67 of cylindrical member 70, then into each respective outlet conduit 40B, through ring 42 and into the lower portion 51 of plenum assembly 45, where it is discharged into outlet pipes 58A and 58B.

The foregoing embodiment has the advantage of providing evenly balanced internal cooling to the extruded tube through a series of insulated inlet and outlet conduits while achieving the superior plastic product produced by means of a continuously rotating die apparatus.

What is claimed is:

1. A rotary film blowhead fed centrally with thermoplastic material for making tubular film comprising film cooling means with interior cooling rings and air supply connectors, said blowhead being rotatably connected to a stationary extruder, characterized in that the individual co-rotating air supply connectors are connected to stationary air flow means by segmented relatively rotatable air distributing rings which are sealed by sealing elements and of which the portion connected to the air flow means is stationary.

2. In a rotary die assembly for receiving molten plastic and extruding a tube thereof, including male and female die members forming an annular extrusion orifice, a supply passage for molten plastic to said orifice, and means for rotating said male and female die members, said male member having conduit means for introducing cooling air into and conduit means for exhausting warmed air from the extruded tube, that improvement wherein said cooling air inlet conduit means comprises a plurality of discrete inlet conduits extending through said male member and connected at their inlet ends at circumferentially spaced apart positions to a wall of an annular inlet plenum so as to receive inlet air through said wall, said plenum located outside of and generally coaxial with said rotary male and female members, said wall constructed to rotate with said discrete inlet conduits and said rotary members, said wall being interconnected with stationary walls forming the remainder of said plenum having means for receiving a supply of cooling air and evenly distributing it annularly therethrough whereby said discrete inlet conduits can receive a substantially uniform flow of air progressively regardless of their rotated position as they rotate with said wall and said rotary members.

3. Apparatus of claim 2 wherein said exhaust conduit means comprises a plurality of discrete exhaust conduits extending through said male member and connected at their outlet ends at circumferentially spaced apart positions to a wall of an annular outlet plenum so as to discharge exhaust air through said wall, said plenum located outside of and generally coaxial with said rotary male and female members, said wall constructed to rotate with said discrete exhaust conduits and said rotary members, said wall being interconnected with stationary walls forming the remainder of said plenum by means permitting relative movement therebetween, and means exhausting said plenum while maintaining substantially uniform pressure throughout the circumferential extent of said plenum.

4. In a rotary die assembly for receiving molten plastic and extruding a tube thereof, including male and female die members forming an annular extrusion orifice, a supply passage for molten plastic to said orifice, and means for rotating said male and female die members, said male member having conduit means for introducing cooling air into and conduit means for exhausting warmed air from the extruded tube, that improvement wherein each of said cooling air inlet conduit means and said warm air exhaust conduit means comprises a plurality of discrete conduits extending from transition means within said male member to circumferentially spaced apart connections to a respective wall of a respective plenum, each of said inlet and outlet plenums located outside of and generally coaxial with said rotary male and female members, said walls to which said conduits are connected constructed to rotate with the respective inlet and exhaust conduits and said rotary die members, said rotating walls being respectively interconnected with stationary walls forming the remainder of the respective inlet and outlet plenums by means permitting relative movement between the respective walls connected to the conduits and the remaining walls of the respective plenums.

5. The apparatus of claim 4 wherein said inlet and outlet plenums comprise adjacent annular structures, the inner walls of said annular structures being those to which the respective conduits are attached, and one of said plenums resting directly upon the other.

6. The apparatus of claim 4 wherein roller means interconnect the plenums with the rotating male and female die members and support the weight of said plenums, and means restraining said stationary walls from rotating with the rotating members.

* * * * *